United States Patent [19]

Nys et al.

[11] Patent Number: 5,010,398
[45] Date of Patent: Apr. 23, 1991

[54] METHOD FOR COLOUR CORRECTION BY DRY DOT ETCHING USING PHOTOGRAPHICALLY PRODUCED MASK

[75] Inventors: Pierre H. Nys, Berchem; Paul W. Vinck, Hove, both of Belgium; Andreas von Erdmannsdorff, Monheim, Fed. Rep. of Germany

[73] Assignee: AGFA-Gevaert, N.V., Mortsel, Belgium

[21] Appl. No.: 372,844

[22] Filed: Jun. 29, 1989

[30] Foreign Application Priority Data

Aug. 23, 1988 [EP] European Pat. Off. ........ 88201787.4

[51] Int. Cl.$^5$ ........................... G03F 3/08; G03F 3/10
[52] U.S. Cl. ........................ 358/80; 358/76; 358/459; 355/20; 355/68; 355/77; 430/44; 430/22
[58] Field of Search ...................... 358/80, 75, 76, 447, 358/448, 455, 456, 459, 460, 298; 355/20, 38, 68, 77; 430/22, 43, 23, 44, 396, 204, 143

[56] References Cited

U.S. PATENT DOCUMENTS

| | | | |
|---|---|---|---|
| 4,305,094 | 12/1981 | Yamada | 358/80 |
| 4,393,399 | 7/1983 | Gast et al. | 358/80 |
| 4,396,940 | 8/1983 | Tanaka et al. | 358/75 |
| 4,414,636 | 11/1983 | Ueda et al. | 358/80 |
| 4,430,668 | 2/1984 | Mices, Jr. | 358/80 |
| 4,463,373 | 7/1984 | Mikami | 358/76 |
| 4,602,294 | 7/1986 | Yamada | 358/80 |
| 4,692,796 | 9/1987 | Yamada et al. | 358/76 |
| 4,708,459 | 11/1987 | Cowan et al. | 430/43 |
| 4,717,954 | 1/1988 | Fujita et al. | 358/80 |
| 4,782,384 | 11/1988 | Tucher et al. | 358/80 |
| 4,802,107 | 1/1989 | Yamamoto et al. | 388/80 |

Primary Examiner—Howard W. Britton
Assistant Examiner—Michael H. Lee
Attorney, Agent, or Firm—William J. Daniel

[57] ABSTRACT

A method for dot-size correction or modification in half-tone colour separations to be used in the production of printing plates for printing reproductions of coloured originals in which a contact print is overexposed through a photographic mask constituted so as to isolate a selected area in addition to being exposed normally for obtaining an exact copy of an original halftone separation. The mask is generated electronically using an electrical signal obtained by scanning each separation, digitizing each signal and storing the digital values in a digital storage device. A halftone separation is visualized electronically as an image in a dislay device, e.g., video tube, an area of said image is defined for isolation and correction and the combination of positive and/or negative separations required to serve as a mask effective for isolating the selected area for purposes of dot evaluation is determined via a look-up table. The mask is visualized on the display device, evaluated for correctness, the isolation area is re-defined visually, and a new combination of separations to effectively mask the re-defined area is determined and evaluated. The resultant mask is reproduced photographically and used to identify the needed degree of dot correction. It is then also used to generate a dot-corrected photographic print by subjecting print material for said print to two photographic exposures, one being the normal exposure to reproduce the corresponding halftone separation and the other being an overexposure through the combination of the photographic mask and the corresponding separation for a dose to give the needed change in dot size.

5 Claims, 1 Drawing Sheet

METHOD FOR COLOUR CORRECTION BY DRY DOT ETCHING USING PHOTOGRAPHICALLY PRODUCED MASK

BACKGROUND OF THE INVENTION

1. Field of the Invention

The present invention relates to dot-size correction or modification in half-tone images, for use in a process for producing colour-corrected or colour-modified colour separations to be used in the production of printing plates for printing reproductions of coloured originals, in particular of colour photographs or art-work.

2. Description of the prior art

Halftone colour separations used for producing printing plates for printing a multi-coloured reproduction usually need some correction before approval for printing is obtained. This correction may involve correction for hue, saturation and brightness value to obtain either a faithfull reproduction of an original or to introduce special colour effects in the reproduction.

One technique, known in the art, that can be used to obtain such corrections or modification is the so-called dry dot etching technique or dry etching technique.

This technique comprises the following steps.

First each area to be corrected or modified is isolated photographically by the photographic production of at least one so-called "drop-out" mask.

Secondly a corrected or modified halftone separation is made by performing in addition to the normally required exposure of a light-sensitive film to obtain an exact copy of a separation, an over-exposure both through the initial separation and through the photographically made drop-out mask.

The production of a drop-out wherein a certain area is set free i.e. isolated, can occur as follows.

The colour in an area to be corrected is e.g. identified through visual assessment by comparison of the area to be isolated with the differently coloured fields of a so-called colour chart.

On such a colour chart is indicated for each colour a particular corresponding combination of positive and-/or negative halftone separations of he original image which needs to be used so that when an exposure is made through this combination of halftone positive and/or negative halftone separations in overlay onto a photographic silver halide emulsion film the area corresponding with the identified colour becomes a transparent region on said film.

For example, the colour "red" is isolated by photographing accurately in registrates the cyan positive separation with the separation with the magneta and yellow negative separations onto a mask film. One or more light-diffusing sheets are arranged in conjunction with the halftone colour separations to suppress the halftone dot structure in the mask. The thus exposed and developed mask film provides light shielding except for the red coloured areas to be modified or corrected in dot size.

Alternatively instead of visual assessement, to compare the area to be isolated with a colour chart one can measure by means of a densitometer the dot-size in a given area to be isolated on each of the halftone separations of the original image. These measurements are performed in registration on each of the halftone separations. The measured density values are expressed in percentage dot size.

A relationship exists between the percentage dot size measured on said halftone separations and the primary colour hue.

According to this relationship a corresponding overlay exposure combination of positive and/or negative halftone separations of said original image can be found for each colour, in other words for each particular combination of percentage dot values in each of the primary colour separations.

By means of this overlay exposure combination of halftone positive and/or negative separation of the original image a photographic mask can be produced in which a denselometrically measured area is reproduced as a clear part, in other words is isolated.

When each such mask is prepared, one has to identify the needed degree of colour correction by calculating the desired dot change.

A dot size change in an area of at least one halftone separation that has been isolated by means of photographic drop-out masking is carried out by performing in sequence the normally required exposure of a light-sensitive print film through the proper initial halftone separation (in order to obtain an exact copy) and a selected amount of over-exposure in registration and the initial halftone separation.

The above described procedure as well as the calculation of the over-exposure dose that is necessary for obtaining a certain percentage dot size change is extensively described in Research Disclosure July 1983, item 23135.

Further information relating to the dry dot etching technique can be found in the European patent applications no. 88200273.6 and no. 87201742.1.

SUMMARY OF THE INVENTION

The prior art method is inconvenient in several respects.

It will be clear from the above description that a number of in-register operations are to be performed. One example is the density measurements that are to be performed in registration in one or more area on each of the halftone separations to identify an area that is to be isolated on a mask.

The larger the number of in-register measurements of the separations that are required, the greater is the risk for errors. Moreover, if the measurements used for generating masks are limited or erroneous, often areas are set free or isolated that were not intended to be set free or some are not set free that should have been. By trial and error involving repeated measurement and production of successive masks, the ultimate mask or set of masks is finally generated.

It will be clear that this task is rather laborious, that the risk of misregistration exists and that the above procedure may consume a lot of photographic material for the production of masks.

It is an object of the present invention to overcome the above defects of the prior art method. More specifically it is an object of the present invention to provide a method wherein colour-corrected or colour-modified halftone colour separations for use in the production of printing plates can be produced that is less laborious, requires fewer photographically produced masks and is less subject to risks of registration errors.

According to the present invention there is provided a method of producing dot-size corrected halftone colour separations of an image for use in making a printing plate for printing reproductions of said image which method comprises the steps of scanning and digitizing each said halftone separation, storing the thus digitized values for each halftone separation into a storage device, visualising from the stored digitized values on an image display device an image corresponding at least one of said halftone separations, defining on said displayed image and by means of said stored data at least one area thereof to be corrected, applying said stored data to a micropressor and calculating by means of a microprocessor said stored data at least one combination of halftone colour separation positives and/or negatives of said displayed image that when approved in overlaying relation onto a photographic film yields a mask capable of for isolating the defined area to be corrected, visualising and evaluating mask alone or in superposed relation with at least one of said halftone separation images visualized on said image display device, redefining said area to be corrected in dependence on the result of said evaluation and recalculating a mask for the redefined area by means of said stored data or by means of data pertaining to the previously calculated mask and visualising said recalculated mask, photographically producing said mask for isolating each to be corrected, determining the percentage dot size correction (increase or decrease) that is required, for the necessary correction of the isolated area, and exposing and photographically processing light-sensitive print material thereby to produce a print exhibiting the required percentage dot-size correction by mask controlled over-exposure in addition to normal exposure through the corresponding halftone separation to reproduce the same.

PREFERRED EMBODIMENTS

A more complete appreciation of the invention and many of the attendant advantages thereof will be readily obtained as the same becomes better understood by reference to the following detailed description.

According to the present invention halftone colour separations of an image which is to be colour corrected are scanned to generate (an electrical representation of that image) and the resultant image signal is digitized. The digitized values can be subsequently converted into corresponding density values since the electrical representation reflects density variations in the images. In a preferred embodiment halftone separations are scanned by means of a video camera comprising a CCD sensor array.

The relative position of the video camera and the halftone images being sensed is fixed. For example the halftone images are positioned one-by-one on a light table in a fixed position relative to a reference point by means of register pins and holes and the video camera is mounted in a unvariable position relative to this light table. Colour separations of an image may be scanned entirely. Alternatively the camera can be zoomed optically in on a particular segment of a halftone colour separation.

Other embodiments suitable for providing an electrical representation of a halftone image such as a laser scanner may be envisioned.

Next, the scanned electrical representation (signal train) of the halftone separations are digitized (for example to 8 bit digital words). Density values or percentage dot values corresponding with the digitized video output in each pixel are obtained by transforming the digitized video output signal (intensity values) into density values or percentage dot values preferably via a LUT (look up table) representing a known relation between each of a range of intensity values as (scanned by means of the video camera) and the corresponding density or percentage dot values.

The sequence of bit words or bitmaps representing the several colour separations are stored in a storage device for example on hard disc.

A microprocessor is coupled to the system. The data that are stored as bitmaps on the hard disc (or alternative storage device) can be applied to said microprocessor and can be processed thereby.

In a next step of the method according the present invention an image obtained with the microprocessor by means of one separation record (bitmap) or a combination of more than one separation records of the original image, is visualised on an image display device (video tube). In a preferred embodiment the digital representations of each of the primary colour separations of the original colour image are applied to a raster image display device, preferably a black-and white monitor. A frame grabber is used to provide synchronisation and analog-to-digital or digital-to-analog conversion between the monitor and a video buffer.

For example a black-and white monitor having a resolution of $512 \times 512$ pixels can be used. These numeric data are merely an illustrative indication and are not meant to be restrictive for the present invention. The video image composed of luminances corresponding with one or more of the primary colour separations is displayed and can be evaluated visually (in a black-and white version) on said monitor.

In the following step an area which is to be isolated or set free in the mask that will be produced is to be identified. In the prior art method an area to be set free was identified by measuring by means of a densitometer the percentage dot values of said area, whereas according to the method of the present invention in register densitometer measurements can be omitted in the individual separations.

Each area to be isolated is identified or pointed on the monitor e.g. by means of a mouse-controlled cursor or a cursor that is controlled by means of another kind of pointing device.

By identifying a certain location on the monitor screen by means of the cursor, the digital values indicative of the image density in said location on each of the colour separations can be recalled from the storage device and can be used for calculation of the mask.

In this way registration errors which were inherent to the prior art method due to the required in register densitometer measurements are avoided.

Additional densitometer measurements may be useful for control or calibration purposes of this procedure.

The above-mentioned microprocessor is coupled to the digital storage device and to the monitor and is provided with a program, usually stored in a memory, by means of which calculations are performed to identify the necessary combination of positive and/or negative halftone separations of the original image to produce a photographic mask in which an area corresponding to the identified area can be set free. The method embodied in this program is part of the prior art and is described in Research disclosure July 1983, item 23135.

The mask identified through these calculations alone or in combination with at least one colour separation of the original is in the following step displayed on the monitor and can be evaluated visually by the operator. Preferably the cyan halftone separation is displayed in combination with the calculated mask since this separation usually provides the necessary information.

If the evaluation of the mask on the monitor is positive i.e. acceptable, a photographic mask is produced. The microprocessor provides a list enumerating the combination of halftone positives and negatives of the original image that is to be assembled in sandwich relation. A mask can be produced from this sandwich by making an unsharp photographic copy of the sandwich onto duplicating or negative working film. The unsharpness is obtained by combining the halftone sandwich with mat diffusion sheets and/or clear spacers. This will eliminate any halftone screen (dot) structure in the resulting mask. If the evaluation of the displayed mask is negative, for example if the intended area is not actually set free, the method is repeated from the identifying procedure either on the displayed original (unacceptable) mask since the density values corresponding with the pixels of said mask are known (stored by) to the microprocessor, or on the image composed of a combination of halftone separation records.

According to the prior art method no preview could be performed, the photographically produced mask was evaluated and the entire procedure was repeated in case the mask did not prove acceptable. According to the method of the present invention the mask is initially evaluated on screen before any photographic mask is produced. Hence this procedure saves time as well as photographic material.

In the last step of the present method, corrected or modified halftone separations suitable for the production of printing plates for printing reproductions of halftone images are produced by making an exact copy of the separation image followed by an over exposure through the photographic mask.

DETAILED DESCRIPTION OF ILLUSTRATIVE EMBODIMENT

Figure 1:
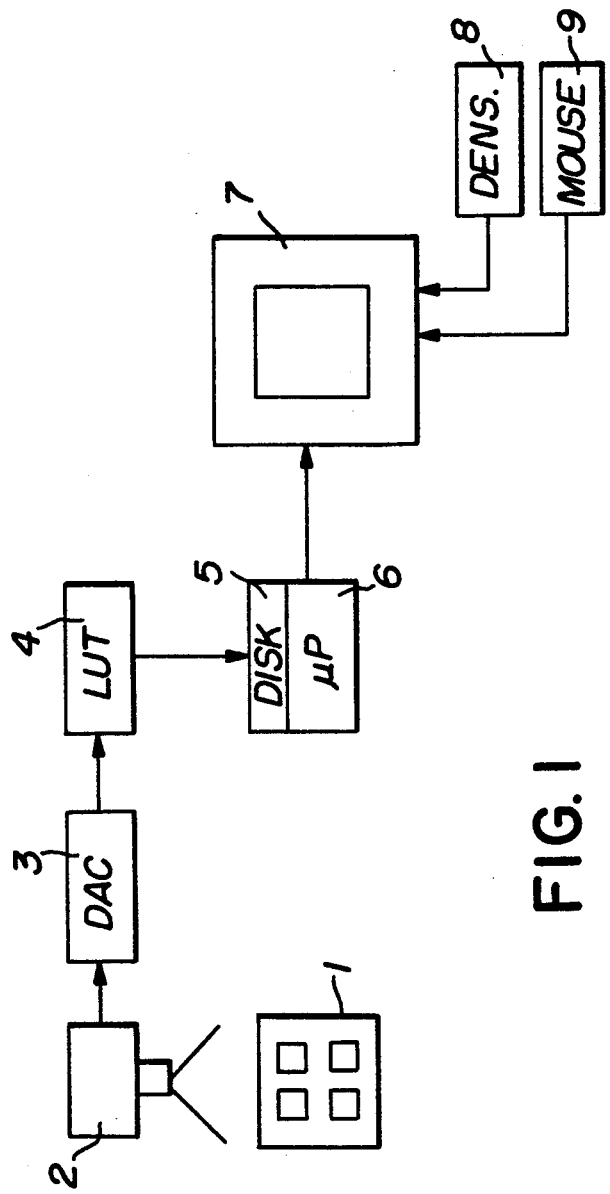
FIG. 1 is a schematic diagram of one embodiment of a system for carrying out the invention.

According to FIG. 1, halftone colour separations of an image that are to be corrected were mounted on a light table 1 and were recorded scanwise by means of a videocamera 2.

The output signal of the video camera was digitized in a DAC 3 and converted into corresponding density values or percentage dot values via LUT 4 and stored in a memory e.g. on a hard disk 5, coupled to a microprocessor unit.

At least one separation record was visualised from the stored date as an image on a black and white monitor 7, for example.

By means of a mouse-controlled cursor at least one area to be isolated was identified on the monitor (the mouse being indicated by reference numeral 9).

A densitometer 8 to perform additional density measurements useful for calibration purposes, was also coupled to the system.

The microprocessor was provided with a program by means of which the necessary combination of positive and/or negative halftone separations to produce a mask in which the identified area was isolated, was determined. The thus-determined mask together with at least one separation was displayed on the monitor 7 for preview and evaluation.

We claim:

1. A method of producing dot-size corrected or modified halftone colour separations of an image for use in making a printing plate for printing reproductions of said image, which method comprises the steps of scanning each of said halftone separations separately to produce an electrical signal representing the same and digitizing said signals, storing said digitized values into a digital storage device, visualising from said digitized values on an image display device an image representative of at least one of said halftone separations, defining on said displayed image and by means of said stored values at least one area to be corrected, calculating by means of a microprocessor to which said stored values are applied at least one combination of halftone colour separation positives and/or negatives of said image that when exposed in overlaying relation on a photographic film yields a mask for isolating each such area to be corrected, visualising and evaluating the resultant mask alone or in superposition with at least one of said halftone separations on said image display device, redefining said area to be corrected in accordance with the result of said evaluation and recalculating a mask therefor by means of the stored data or by means of data pertaining to the previously calculated mask and visualising said recalculated mask for further evaluation as an acceptable final mask, photographically producing said recalculated mask for isolating said area to be corrected, determining the percentage dot size correction (increase or decrease) that is required, and exposing and processing light-sensitive print material to produce a print exhibiting the required percentage dot-size correction by subjecting said print material to a normal exposure for reproducing the corresponding original halftone separation plus an additional overexposure through the combination of said final mask and the corresponding halftone separation for a dose to give the determined change in dot size.

2. Method according to claim 1 wherein said halftone colour separations of said image are scanned by means of a video camera.

3. Method according to claim 1 wherein said digitized data are converted into corresponding density values or percentage dot values or percentage dot values by means of a look up table representing a relation between output values of a video camera and corresponding density values or percentage dot values.

4. Method according to claim 1 wherein said image display device is a video monitor.

5. Method according to claim 1 wherein said area to be corrected is defined on the monitor screen by means of a cursor controlled by a pointing device, the corresponding stored data for said area being retrieved from said storage device and being used to calculate said mask.

* * * * *